United States Patent
Schwerer et al.

(10) Patent No.: US 8,280,674 B2
(45) Date of Patent: Oct. 2, 2012

(54) APPARATUS FOR MEASURING SURFACE TEMPERATURE USING EMBEDDED COMPONENTS

(75) Inventors: Michael S. Schwerer, Plano, TX (US); William C. Strauss, Flower Mound, TX (US)

(73) Assignee: Raytheon Company, Waltham, MA (US)

( * ) Notice: Subject to any disclaimer, the term of this patent is extended or adjusted under 35 U.S.C. 154(b) by 596 days.

(21) Appl. No.: 12/019,502

(22) Filed: Jan. 24, 2008

(65) Prior Publication Data

US 2009/0192757 A1    Jul. 30, 2009

(51) Int. Cl.
  *G01K 1/00* (2006.01)
  *G01K 3/00* (2006.01)
(52) U.S. Cl. ........................................ 702/130; 374/137
(58) Field of Classification Search .................... 702/99, 702/127, 81, 84–85, 130–133, 179, 182–183; 700/8, 299–300; 219/67, 50, 200, 221, 385, 219/482, 520, 538; 343/872, 702, 704–705; 374/1, 15, 110–113, 137, 163, 189, 196, 374/E1.001, 100–101

See application file for complete search history.

(56) References Cited

U.S. PATENT DOCUMENTS

| | | | |
|---|---|---|---|
| 4,092,862 A | 6/1978 | Taylor | 374/137 |
| 4,385,658 A | 5/1983 | Leonard | 165/11.1 |
| 4,929,092 A | 5/1990 | Taguchi et al. | 374/183 |
| 4,937,552 A | 6/1990 | Lam | 338/25 |
| 5,484,206 A | 1/1996 | Houldsworth | 374/181 |
| 5,741,074 A | 4/1998 | Wang et al. | 374/185 |
| 5,831,511 A | 11/1998 | Manning et al. | 338/25 |
| 5,880,365 A | 3/1999 | Olin et al. | 73/204.25 |
| 6,220,750 B1 | 4/2001 | Palti | 374/164 |
| 6,450,024 B1 | 9/2002 | McCulloch et al. | 73/204.25 |
| 6,666,578 B2 | 12/2003 | Gibbs et al. | 374/142 |
| 7,397,442 B2 * | 7/2008 | Hawes | 343/872 |
| 7,404,320 B2 | 7/2008 | Sakuma et al. | 73/204.26 |
| 7,621,180 B2 | 11/2009 | Sakuma | 73/204.26 |
| 7,789,554 B2 | 9/2010 | Sattler et al. | 374/110 |
| 2007/0120759 A1 | 5/2007 | Hawes | 343/872 |
| 2007/0295712 A1* | 12/2007 | Forman et al. | 219/492 |
| 2007/0295713 A1* | 12/2007 | Carlton-Foss | 219/497 |

FOREIGN PATENT DOCUMENTS

JP    2005-133807    5/2005
RU    2228535 C1 *  5/2004

OTHER PUBLICATIONS

Dmitrienko et al., Method Measuring Complex Dielectric Permitivity of Radio Absorption Composite Materials With Heating, May 5, 2004, RU 2228535 C1, English version.*
John et al., Advancement of Multifunctional Support Structure Technologies (AMFSST), Sep. 17-19, 2007, EDA Publishing/ THERMINIC 2007, pp. 98-103.*
Antyufeyev et al., Experimental Estimation of Influence of Heated Antenna Radome on Quality of Functioning of Radiometric Information Systems of Infra-Red and Millimeter Wave Bands, Sep. 9-12, 2003, International Conference on Antenna Theory and Techniques, Sevastopol, Ukraine, pp. 671-673.*

(Continued)

Primary Examiner — Toan M Le

(57) ABSTRACT

In one embodiment, a temperature sensing apparatus includes two temperature sensors that are disposed at differing depths from a surface and a measurement circuit that is coupled to the temperature sensors. The measurement circuit is operable to calculate the temperature of the surface based on a first temperature of one temperature sensor with a second temperature of the other temperature sensor.

22 Claims, 2 Drawing Sheets

OTHER PUBLICATIONS

McDonnell Douglas Astronautics Company, NASA Radome Program, Sep. 1969, Contract NAS9-8865, 76 pp.*

Shingo, Tanaka, "Patent Abstracts of Japan," European Patent Office, Publication No. 2005133807, Publication Date May 26, 2005, 1 page.

PCT, "Notification of Transmittal of the International Search Report and the Written Opinion of the International Searching Authority, or the Declaration," International Application No. PCT/US2009/030710, May 7, 2009, 11 pages.

Pending U.S. Appl. No. 13/084,811 entitled "Apparatus for Remotely Measuring Surface Temperature Using Embedded Components" by Michael S. Schwerer, 21 pages, Apr. 12, 2011.

* cited by examiner

APPARATUS FOR MEASURING SURFACE TEMPERATURE USING EMBEDDED COMPONENTS

GOVERNMENT RIGHTS

This invention was made with Government support under N00024-05-C-5346 awarded by DDG 1000. The Government may have certain rights in this invention.

TECHNICAL FIELD OF THE DISCLOSURE

This disclosure relates generally to temperature sensors, and more particularly, to an apparatus for measuring surface temperature using embedded components.

BACKGROUND OF THE DISCLOSURE

Temperature sensors have been developed to provide electrical sensing of temperature at virtually any point of interest. Common types of temperature sensors include thermocouples or resistance temperature detectors (RTDs) that utilize known variations in thermal gradients or electrical resistance, respectively, in order to generate an electrical signal representative of the temperature sensor's ambient temperature. Known manufacturing techniques have enabled the creation of temperature sensors that are relatively small in size to facilitate measurement of temperatures at correspondingly small regions of interest.

SUMMARY OF THE DISCLOSURE

In one embodiment, a temperature sensing apparatus includes two temperature sensors that are disposed at differing depths from a surface and a measurement circuit that is coupled to the temperature sensors. The measurement circuit is operable to calculate the temperature of the surface based on a first temperature of one temperature sensor with a second temperature of the other temperature sensor.

Embodiments of the disclosure may provide numerous technical advantages. Some, none, or all embodiments may benefit from the below described advantages. According to one embodiment, measurement of a surface of a structure may be obtained without placement of temperature sensors directly on the surface. This feature may be particularly beneficial for systems where placement of temperature sensors directly on a particular surface are not enabled or desired. For example, known radome designs incorporate environmental coatings that are not well suited for placement of temperature sensors directly on their surface. Placement under the surface of the environmental coating may protect the temperature sensors from potentially harsh environments, such as radiation, reactive chemicals, extreme temperatures, physical impact, and/or severe weather. As another example, temperature sensors may be embedded at differing depths within a piping structure. Hazardous or reactive chemicals in the piping structure may be protected from direct exposure to the sensors while measuring its temperature.

Other technical advantages will be apparent to one of skill in the art.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF EXAMPLE EMBODIMENTS OF THE DISCLOSURE

As previously described, the relatively small thickness of temperature sensors have enabled measurement of temperatures at relatively small regions of interest. There are some devices, however, for which temperature measurement using these temperature sensors are still generally impractical. For example, placement of a temperature sensor directly on an outer surface of a radome may be generally impractical due to environmental coatings on its outer surface. A radome is a type of covering that may be placed over an antenna for shielding the various elements of the antenna from the environment. It may be desired in some cases, however, to measure the outer surface of the radome. During inclement weather conditions, a layer of ice may form on the outer surface of the radome that may hamper proper operation of the antenna. A temperature sensor may be used to monitor the outer surface for icing conditions; however, known radome designs are not well suited for placement of temperature sensors directly on the radome's outer surface.

Figure 1:
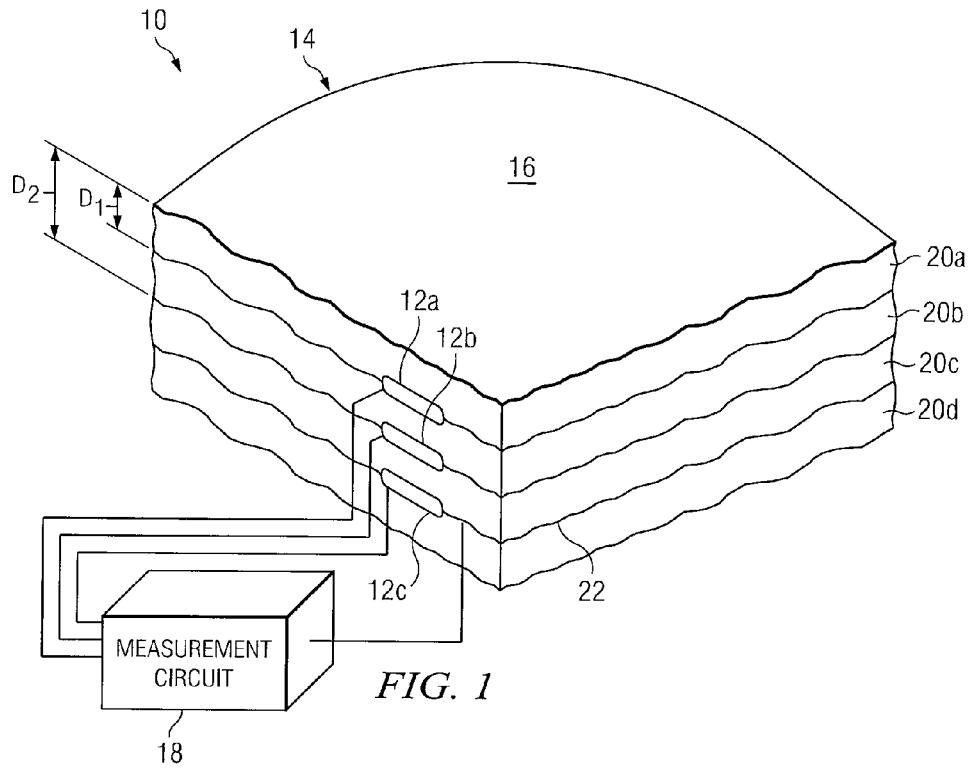
FIG. 1 is a partial perspective view of one embodiment of a temperature sensing apparatus that is configured on a structure.

FIG. 1 shows one embodiment of a temperature sensing apparatus 10 for measuring surface temperature using embedded components according to the teachings of the present disclosure. Temperature sensing apparatus 10 generally includes two temperature sensors 12a and 12b that are disposed in a structure 14 at different depths $D_1$ and $D_2$ from an outer surface 16 of the structure 14. A measurement circuit 18 is coupled to each of the temperature sensors 12a and 12b and operable to calculate the temperature of the outer surface 16 by extrapolating the relative measurements from both temperature sensors 12a and 12b at any point in time.

According to the teachings of the present disclosure, calculation of the temperature of the outer surface and heat flow to the outer surface 16 may be provided using known thermal resistance values of materials from which the structure 14 is made along with known temperature differentials existing in the structure. Because each temperature sensor 12 exists at varying depths $D_1$ and $D_2$ relative to one another, the thermal resistance between each temperature sensor 12a and 12b and the outer surface 16 will be different. Thus, variations in temperature of the outer surface 16 will cause a corresponding differential temperature to be formed between the two temperature sensors 12a and 12b. Having knowledge of this thermal resistance difference, the measurement circuit 18 may be operable to calculate the temperature of the outer surface and heat flow to the outer surface 16 using the measured differential temperature between the two temperature sensors 12a and 12b.

In one embodiment, structure 14 may be formed of a number of layers 20 that are disposed adjacent to one another. Temperature sensor 12a may be disposed between layer 20a and 20b such that the thermal resistance between the outer surface 16 and temperature sensor 12a is a function of the material(s) from which layer 20a is formed. Temperature sensor 12b may be disposed between layer 20b and 20c such that the thermal resistance between the outer surface 16 and temperature sensor 12b may be a function of the material(s) from which layer 20a and 20b are formed. The layers 20a, 20b, 20c, and 20d may be formed of any suitable material. In one embodiment, layers 20a, 20b, 20c, and 20d may be made of a similar material. In another embodiment, layers 20a, 20b, 20c, and 20d may each be made of differing materials. For example, each of layers 20 may be formed of one or a combination of quartz laminate, fiberglass, RAYDEL™, KAPTON™, or other material that may provide beneficial electromagnetic and/or structural characteristics.

Measurement circuit 18 may be any type of circuit operable to calculate the temperature of the outer surface 16 using signals from temperature sensors 12a and 12b. In one embodiment, measurement circuit 18 may be a digital circuit, such as a processor-based computer circuit in which calculation of the temperature of the outer surface 16 is performed using digital signals. In another embodiment, measurement circuit 18 may be an analog circuit such that calculation of the outer surface temperature is accomplished using known analog circuit techniques.

In one embodiment, a heater element 22 may be provided that is disposed on a surface of the structure 14. The measurement circuit 18 may be coupled to heater element 22 and operable to selectively apply electrical power to the heater element 22 such that the temperature of outer surface 16 may be controlled. Measurement circuit 18 may selectively apply heat to the heater element 22 using any suitable control loop. In one embodiment, measurement circuit 18 may be implemented with a cascading control loop for controlling the temperature of the outer surface 16. In another embodiment, measurement circuit 18 may be implemented with a proportional/integral/derivative (PID) control loop for controlling the temperature of the outer surface 16. In another embodiment, measurement circuit 18 may be implemented with a combination of a cascading control loop and a proportional/integral/derivative (PID) control loop for controlling the temperature of the outer surface 16.

In one embodiment another temperature sensor 12c may be provided for measuring the temperature of the heater element 22. In order to provide relatively accurate measurement of the heater element 22, temperature sensor 12c may be disposed in relatively close proximity to the heater element 22. In one embodiment, the measurement circuit 18 is operable to remove electrical power from the heater element 22 in the event that the heater element temperature exceeds a threshold temperature. Certain embodiments that are operable to remove electrical power from the heater element 22 may provide an advantage in that thermal runaway caused by heater element 22 that is turned on by measurement circuit 18 for an excessive period of time may be alleviated.

Temperature sensors 12 may be any suitable type that are operable to create an electrical signal representative of an ambient temperature. In one embodiment, temperature sensors 12 may be a thermocouple that is configured to generate an electrical voltage based upon a temperature gradient within a metal. In another embodiment, temperature sensors 12 may be a resistance temperature detector (RTD). These resistance temperature detectors enable relatively accurate temperature measurement using materials with a known resistance that varies predictably according to their ambient temperature. Materials commonly used for this purpose may include platinum or palladium, which are relatively stable over a wide temperature range. In another embodiment, temperature sensors 12a and 12b used for determining the temperature of the outer surface 16 are 3-wire or 4-wire resistance temperature detectors and temperature sensor 12c for sensing the temperature of heater element 22 is a 2-wire resistance temperature detector. Temperature sensor 12c may be used to determine an over-temperature condition of heater element 22 and as such, does not require the accuracy of temperature sensors 12a and 12b.

Figure 2:
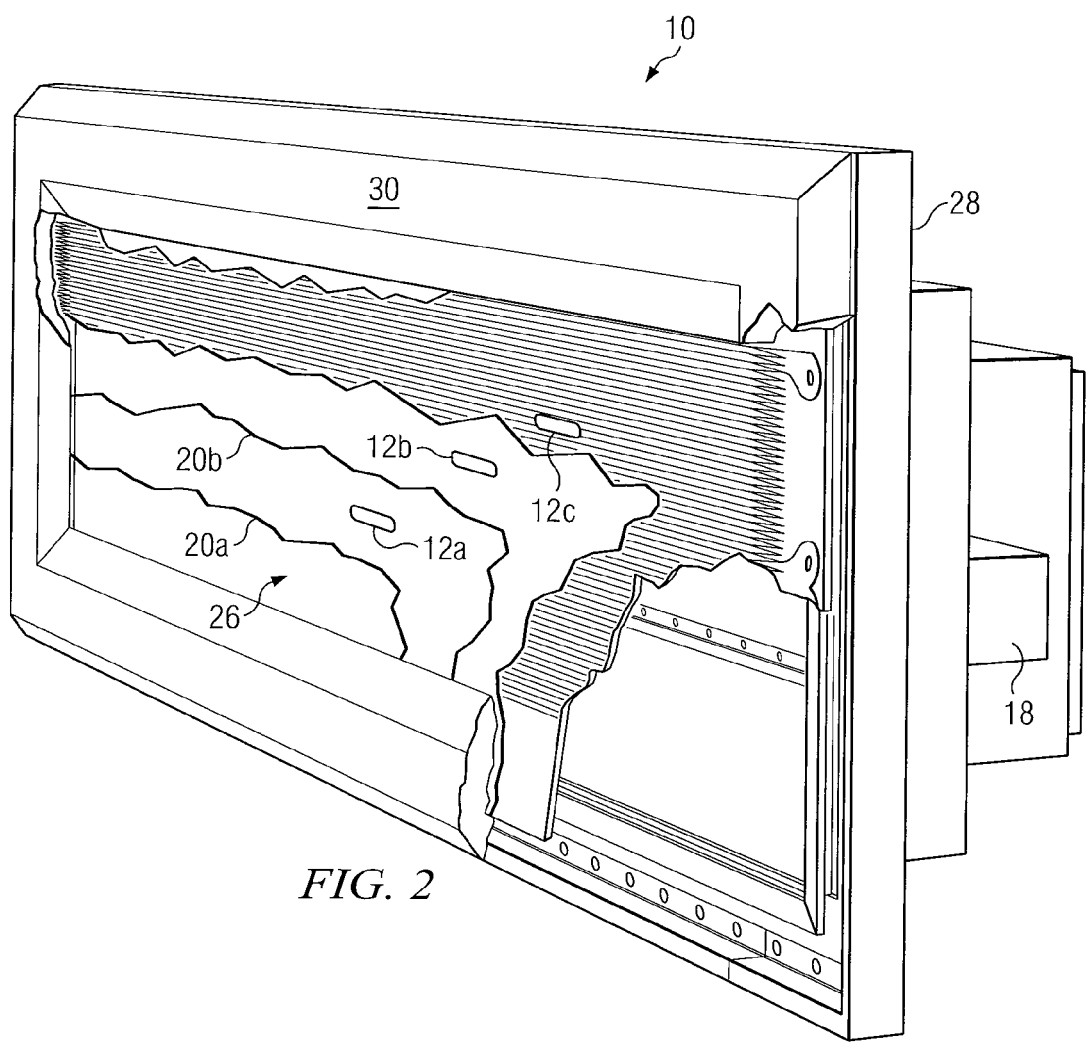
FIG. 2 is a perspective view of another embodiment of a temperature sensing apparatus that is configured on a radome of an antenna.

FIG. 2 shows one particular embodiment of a temperature sensing apparatus 10 that may be implemented on radome 26 in which several layers 20 have been peeled away to reveal several components of the temperature sensing apparatus 10. As described previously, radome 26 may be configured to cover the opening of an antenna 28 for shielding various elements (not specifically shown) of the antenna 28 from the environment. In one embodiment, the radome 26 may be formed of a number of layers 20a, 20b, and 20c such that temperature sensor 12a is disposed between layers 20a and 20b and temperature sensor 12b is disposed between layers 20b and 20c.

Heater element 22 may be disposed on a surface of the layer 20c opposite temperature sensor 12b. In one embodiment, heater element 22 may be substantially flat and extend over the surface of layer 20c for heating the outer surface 16 of the radome 26 in a relatively even manner. In the particular embodiment shown, one temperature sensing apparatus 10 is implemented for determining the temperature of the outer surface 16; however, a number of temperature sensing apparatuses 10 may be disposed at various locations on the radome 26.

An outer ring 30 may be included for mounting the edge of the radome 26 to the antenna 28 and/or controlling the radiation pattern of the antenna 28. A field region 32 of the radome 26 generally refers to a portion of the radome 26 that is not adjacent the outer ring 30. It is through this field region 32 that electromagnetic radiation used by antenna 28 may pass. In one embodiment, temperature sensors 12a and 12b may be disposed within this field region 32 for providing a relatively accurate measurement of the outer surface 16 where electromagnetic radiation may be affected.

Figure 3:
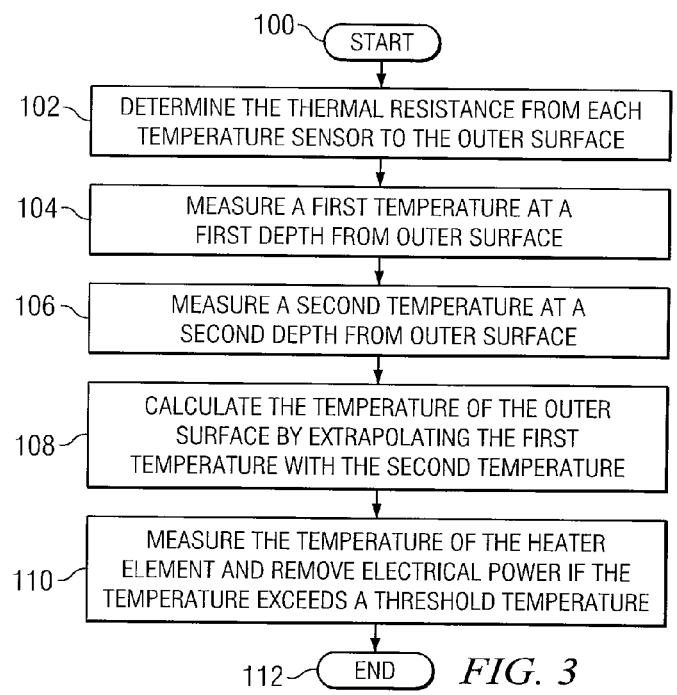
FIG. 3 is a flowchart showing several actions that may be taken by the temperature sensing apparatus of FIG. 1 or 2 to measure the temperature of the desired surface.

FIG. 3 shows a series of actions that may be performed to measure the temperature of the outer surface 16 of a locally flat region of a structure 14, such as a radome 26 or, alternatively, the inner surface of a tank or pipe. In act 100, the process is initiated. The process may be initiated by applying electrical power to the measurement circuit 18 such that the measurement circuit 18 may process signals from the temperature sensors 12 and perform other functions as described below.

In act 102, the thermal resistance from temperature sensor 12a to outer surface 16 and the thermal resistance from temperature sensor 12b to outer surface 16 may be determined. The thermal resistance generally refers to a resistance to the movement of thermal energy through a material, which in this particular case, is the material from which a flat structure, such as a radome 26 is made. In one embodiment, thermal resistance values may be estimated as a function of the intrinsic thermal resistivity of the material and the temperature sensors' 12a and 12b depth $D_1$ and $D_2$ from the outer surface 16.

In another embodiment, thermal resistance values may be determined by calibrating the temperature sensing apparatus 10 in which the thermal resistance of layers 20a and 20b are measured. Calibration of the temperature sensing apparatus 10 may be performed following manufacture and/or periodically throughout its serviceable life.

The temperature measurement apparatus 10 may be calibrated by measuring various temperature values of each of the temperatures sensors 12a and 12b while the outer surface 16 is subjected to a range of temperature variations. In this particular embodiment, a non-permanent temperature sensor may be temporarily attached to the outer surface 16 for temperature measurement of the outer surface 16. While the outer surface 16 is subjected to varying ambient temperatures, measured values may be obtained from temperature sensors 12a and 12b. These measured values may then be used to derive apparent thermal resistance values that may then be used as calibration factors for calculating the outer surface temperature during operation of the temperature sensing apparatus 10. Certain embodiments incorporating a calibration process may provide an advantage in that apparent thermal resistance values may be determined for each structure 14 manufactured in order to cancel distribution error that may occur during the manufacturing process.

Acts 104 through 108 describe one embodiment of a method of operation of the temperature sensing apparatus 10. In act 104, the temperature sensing apparatus 10 may measure a first temperature of structure 14 at a first depth from outer surface 16 using temperature sensor 12a. In act 104, the temperature sensing apparatus 10 may measure a second temperature of structure 14 at a second depth from outer surface 16 using temperature sensor 12b. In operation, the first temperature and second temperature will vary according to thermal resistance values determined in act 102 and the heat flow through the intervening material. Using the measured temperature values, the measurement circuit 18 may then calculate the outer surface temperature by extrapolating the first temperature with the second temperature. In one embodiment, the measurement circuit 18 may calculate the outer surface temperature according to the formula:

$$\text{surface temperature} = T2 - (T1-T2) * Tca * A / (Tcb * B)$$

where:
T1—measured temperature of temperature sensor 12b
T2—measured temperature of temperature sensor 12a
Tca—Thermal conductivity of layer 20b
A—thickness of layer 20b
Tcb—Thermal conductivity of layer 20a
B—thickness of layer 20a

The previously described formula is generally based on heat movement from the heater element 22 only towards the outer surface 16. That is, layer 20c is assumed to be adiabatic in that no heat movement through this layer occurs.

The heat flow can also be derived from the available information as:

$$\text{Heat Flow} = (T1-T2) * Tca * A = (T2-T\text{surface}) * Tcb * B$$

For example, the heat flow may be important in the case of a surface coated with ice. The latent heat of fusion of the ice will draw out more heat than water at the same freezing temperature. In this circumstance the greater heat flow will indicate a colder temperature at the surface than would physically be measured. Then end result is that the control system may operate to compensate for the colder temperature by supplying more heat, which is as required in the presence of ice.

In a particular embodiment in which heat movement through layer 20c or layer 20d may not unduly affect the accuracy of the calculated temperature, layer 20c may not be needed. Thus, heater element 22 may be configured adjacent temperature sensor 12b in which temperature sensor 12c is not implemented.

In one embodiment, the measurement circuit 18 may selectively provide electrical power to heater element 22 for controlling the outer surface temperature. Control of the outer surface temperature may be provided using a control loop configured in measurement circuit 18. In one embodiment, measurement circuit 18 may incorporate a cascading control loop. In another embodiment, measurement circuit 18 may incorporate a proportional-integral-derivative (PID) control loop. The proportional-integral-derivative control loop may provide an advantage in that each portion of the PID control loop may be selectively weighted for tuning the control loop at various anticipated environmental conditions. That is, various weightings of the proportional, integral, or derivative portions of the PID control loop may be individually weighted to counteract any foreseeable temperature rate changes or extremes to which the structure 14 may be subjected during operation.

In act 110, measurement circuit 18 may measure the temperature of the heater element 22 using temperature sensor 12c disposed in close proximity to the heater element 22. In the event that the temperature of the heater element 22 exceeds a threshold temperature, the measurement circuit 18 may be operable to remove electrical power from the heater element 22. The threshold temperature may be determined by selecting a nominal temperature at which damage to the heater element 22 and/or structure 14 may occur due to overheating. Thus, the measurement circuit 18 may be operable to automatically remove electrical power from the heater element 22 in order to prevent damage that may be caused by a control loop in thermal runaway.

Acts 104 through 110 are continually or periodically performed throughout operation of the temperature sensing apparatus 10. When measurement of the outer surface 16 is no longer needed or desired, operation of the measurement circuit 18 is halted in which the process is ended in act 112.

A temperature sensing apparatus 10 has been described that may provide temperature sensing of a surface 16 without the need for placement of temperature sensors 12 directly on the surface 16. Using a differential measurement provided by two temperature sensors 12a and 12b placed at varying depths $D_1$ and $D_2$ from the surface 16, a relatively accurate measurement of the surface 16 may be obtained. The temperature sensing apparatus 10 may be particularly beneficial in scenarios where direct placement of temperature sensors at a point of interest is impractical or may hamper the performance of other associated mechanisms that may use this surface 16.

Although the present disclosure has been described in several embodiments, a myriad of changes, variations, alterations, transformations, and modifications may be suggested to one skilled in the art, and it is intended that the present disclosure encompass such changes, variations, alterations, transformations, and modifications as falling within the spirit and scope of the appended claims.

What is claimed is:

1. A temperature sensing apparatus comprising:
   a radome having a first layer, a second layer, and a third layer that are disposed adjacent one another, the first layer having a first surface opposite the second layer;
   a first temperature sensor disposed between the first layer and the second layer;
   a second temperature sensor disposed between the second layer and the third layer;
   a heater element disposed on a second surface of the third layer opposite the second layer; and
   a measurement circuit coupled to the first temperature sensor, the second temperature sensor and the heater element, the measurement circuit operable to:
   calculate the first surface temperature of the first surface based on a first temperature of the first temperature sensor and a second temperature of the second temperature sensor; and control the first surface temperature of the first surface by selectively applying electrical power to the heater element using the calculated first surface temperature.

2. The temperature sensing apparatus of claim 1, wherein the measurement circuit is operable to measure a third temperature of the heater element using a third temperature sensor and remove electrical power from the heater element if the third temperature exceeds a threshold temperature.

3. A temperature sensing apparatus comprising:
a first temperature sensor disposed in a structure at a first depth from a first surface of the structure;
a second temperature sensor disposed in the structure at a second depth from the first surface, the second depth being greater than the first depth; and
a measurement circuit coupled to the first temperature sensor and the second temperature sensor and operable to calculate a first surface temperature of the first surface based on a first temperature of the first temperature sensor and a second temperature of the second temperature sensor;
wherein the structure is a radome.

4. The temperature sensing apparatus of claim 3, wherein the structure comprises a first layer, a second layer, and a third layer, the first temperature sensor being disposed between the first layer and the second layer and the second temperature sensor being disposed between the second layer and the third layer.

5. The temperature sensing apparatus of claim 4, wherein the measurement circuit is operable to determine the first surface temperature based on a first known thermal resistance and a first thickness of the first layer and a second known thermal resistance and a second thickness of the second layer.

6. The temperature sensing apparatus of claim 3, wherein the first temperature sensor and second temperature sensor are disposed in a field region of the radome.

7. A plurality of temperature sensing apparatuses of claim 3, each of the plurality of temperature sensing apparatuses being disposed at various locations on the structure.

8. A temperature sensing apparatus comprising:
a first temperature sensor disposed in a structure at a first depth from a first surface of the structure;
a second temperature sensor disposed in the structure at a second depth from the first surface, the second depth being greater than the first depth;
a measurement circuit coupled to the first temperature sensor and the second temperature sensor and operable to calculate a first surface temperature of the first surface based on a first temperature of the first temperature sensor and a second temperature of the second temperature sensor; and
a heater element disposed in the structure at a third depth from the first surface, the third depth being greater than or equal to the second depth, the measurement circuit coupled to the heater element and operable to control the first surface temperature by selectively applying electrical power to the heater element using the calculated first surface temperature.

9. The temperature sensing apparatus of claim 8, wherein the measurement circuit is operable to measure a third temperature of the heater element using a third temperature sensor and remove electrical power from the heater element if the third temperature exceeds a threshold temperature.

10. The temperature sensing apparatus of claim 8, wherein the measurement circuit is operable to control the temperature of the first surface using a cascading control loop algorithm.

11. The temperature sensing apparatus of claim 8, wherein the measurement circuit is operable to control the temperature of the first surface using a proportional/integral/derivative (PID) control loop algorithm.

12. The temperature sensing apparatus of claim 8, wherein the measurement circuit is operable to control the temperature of the first surface using a cascading control loop algorithm and a proportional/integral/derivative (PID) control loop algorithm.

13. The temperature sensing apparatus of claim 8, wherein the electrical power is a three-phase electrical power, each phase of the three-phase electrical power having the first temperature sensor, the second temperature sensor, and the heater element.

14. A method comprising:
measuring with a first temperature sensor a first temperature of a structure at a first depth from a first surface;
measuring with a second temperature sensor a second temperature of the structure at a second depth from the first surface, the second depth being greater than the first depth; and
calculating a first surface temperature of the first surface by extrapolating the first temperature with the second temperature;
wherein measuring a first temperature of the structure further comprises measuring a first temperature of a radome.

15. The method of claim 14, wherein applying electrical power to the heater element further comprising applying, using a silicon controlled rectifier, electrical power to the heater element at a zero crossing point.

16. The method of claim 14, further comprising calibrating the first temperature and the second temperature prior to measuring the first temperature.

17. The method of claim 14, wherein calculating a first surface temperature of the first surface by extrapolating the first temperature with the second temperature further comprises calculating the first surface temperature of the first surface based on a first known thermal resistance and a first thickness of the structure at the first depth and a second known thermal resistance and a second thickness of the structure at the second depth.

18. A method comprising:
measuring with a first temperature sensor a first temperature of a structure at a first depth from a first surface;
measuring with a second temperature sensor a second temperature of the structure at a second depth from the first surface, the second depth being greater than the first depth;
calculating a first surface temperature of the first surface by extrapolating the first temperature with the second temperature; and
controlling the first surface temperature of the first surface by applying electrical power to a heater element disposed a third depth from the first surface, the third depth being greater than or equal to the second depth.

19. The method of claim 18, wherein controlling the first surface temperature of the first surface further comprises controlling the first surface temperature using a proportional/integral/derivative (PID) control loop algorithm.

20. The method of claim 18, wherein controlling the first surface temperature of the first surface further comprises controlling the first surface temperature using a cascading control loop algorithm.

21. The method of claim 18, wherein controlling the first surface temperature of the first surface further comprises controlling the first surface temperature using a proportional/integral/derivative (PID) control loop algorithm and a cascading control loop algorithm control loop algorithm.

22. The method of claim 18, further comprising removing electrical power to the heater element if a heater element temperature exceeds a threshold temperature.

* * * * *